(12) United States Patent
Kwon et al.

(10) Patent No.: US 8,078,838 B2
(45) Date of Patent: Dec. 13, 2011

(54) MULTIPROCESSOR SYSTEM HAVING MULTIPORT SEMICONDUCTOR MEMORY WITH PROCESSOR WAKE-UP FUNCTION RESPONSIVE TO STORED MESSAGES IN AN INTERNAL REGISTER

(75) Inventors: Jin-Hyoung Kwon, Seongnam-si (KR); Han-Gu Sohn, Suwon-si (KR); Kwang-Myeong Jang, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 530 days.

(21) Appl. No.: 12/235,816

(22) Filed: Sep. 23, 2008

(65) Prior Publication Data
US 2009/0089545 A1   Apr. 2, 2009

(30) Foreign Application Priority Data
Sep. 28, 2007   (KR) ..................... 10-2007-0097643

(51) Int. Cl.
*G06F 15/16* (2006.01)
(52) U.S. Cl. ............................................. 712/34; 712/40
(58) Field of Classification Search .................. None
See application file for complete search history.

(56) References Cited

U.S. PATENT DOCUMENTS

| | | | | |
|---|---|---|---|---|
| 5,142,683 A * | 8/1992 | Burkhardt et al. | ............ | 709/215 |
| 5,210,828 A * | 5/1993 | Bolan et al. | ............ | 709/214 |
| 5,541,862 A * | 7/1996 | Bright et al. | ............ | 702/122 |
| 5,608,873 A * | 3/1997 | Feemster et al. | ............ | 709/214 |
| 5,692,197 A * | 11/1997 | Narad et al. | ............ | 713/323 |
| 5,708,659 A * | 1/1998 | Rostoker et al. | ............ | 370/392 |
| 5,794,054 A * | 8/1998 | Le et al. | ............ | 710/240 |
| 5,848,281 A * | 12/1998 | Smalley et al. | ............ | 713/322 |
| 5,915,088 A * | 6/1999 | Basavaiah et al. | ............ | 712/28 |
| 5,970,069 A * | 10/1999 | Kumar et al. | ............ | 370/402 |
| 6,425,122 B1 * | 7/2002 | Klingman | ............ | 717/124 |
| 6,754,509 B1 * | 6/2004 | Khan et al. | ............ | 455/556.1 |
| 6,912,716 B1 * | 6/2005 | Johanson et al. | ............ | 719/312 |
| 7,289,823 B1 * | 10/2007 | Kumar et al. | ............ | 455/550.1 |
| 7,869,459 B2 * | 1/2011 | Day et al. | ............ | 370/464 |
| 2002/0091826 A1 * | 7/2002 | Comeau et al. | ............ | 709/226 |
| 2002/0165896 A1 * | 11/2002 | Kim | ............ | 709/102 |
| 2003/0093628 A1 * | 5/2003 | Matter et al. | ............ | 711/153 |
| 2003/0174543 A1 * | 9/2003 | Nagai et al. | ............ | 365/189.05 |
| 2004/0098549 A1 * | 5/2004 | Dorst | ............ | 711/167 |

(Continued)

FOREIGN PATENT DOCUMENTS
WO    03100632 A2   12/2003

*Primary Examiner* — Keith Vicary
(74) *Attorney, Agent, or Firm* — Volentine & Whitt, PLLC

(57) ABSTRACT

A multiport semiconductor memory device having a processor wake-up function and multiprocessor system, the multiprocessor system including a first processor configured to perform a first predetermined task; a second processor configured to perform a second predetermined task; and a multiport semiconductor memory device coupled to the first and second processors. The multiport semiconductor memory device includes a memory cell array having at least one shared memory area; a first port coupled to the at least one shared memory area; a second port coupled to the at least one shared memory area; and a wake-up signal generator. The first processor is coupled to the at least one shared memory area via the first port, the second processor is coupled to the at least one shared memory area via the second port, and the wake-up signal generator is coupled to the first processor and the second processor.

19 Claims, 8 Drawing Sheets

U.S. PATENT DOCUMENTS

| | | | |
|---|---|---|---|
| 2004/0107264 A1* | 6/2004 | Nishida | 709/213 |
| 2006/0034611 A1* | 2/2006 | Li | 398/135 |
| 2006/0069738 A1* | 3/2006 | Hoogerbrugge | 709/213 |
| 2006/0095849 A1* | 5/2006 | Vertaschitsch et al. | 715/717 |
| 2007/0079161 A1 | 4/2007 | Gupta | |
| 2011/0010557 A1* | 1/2011 | Kagan et al. | 713/180 |

* cited by examiner

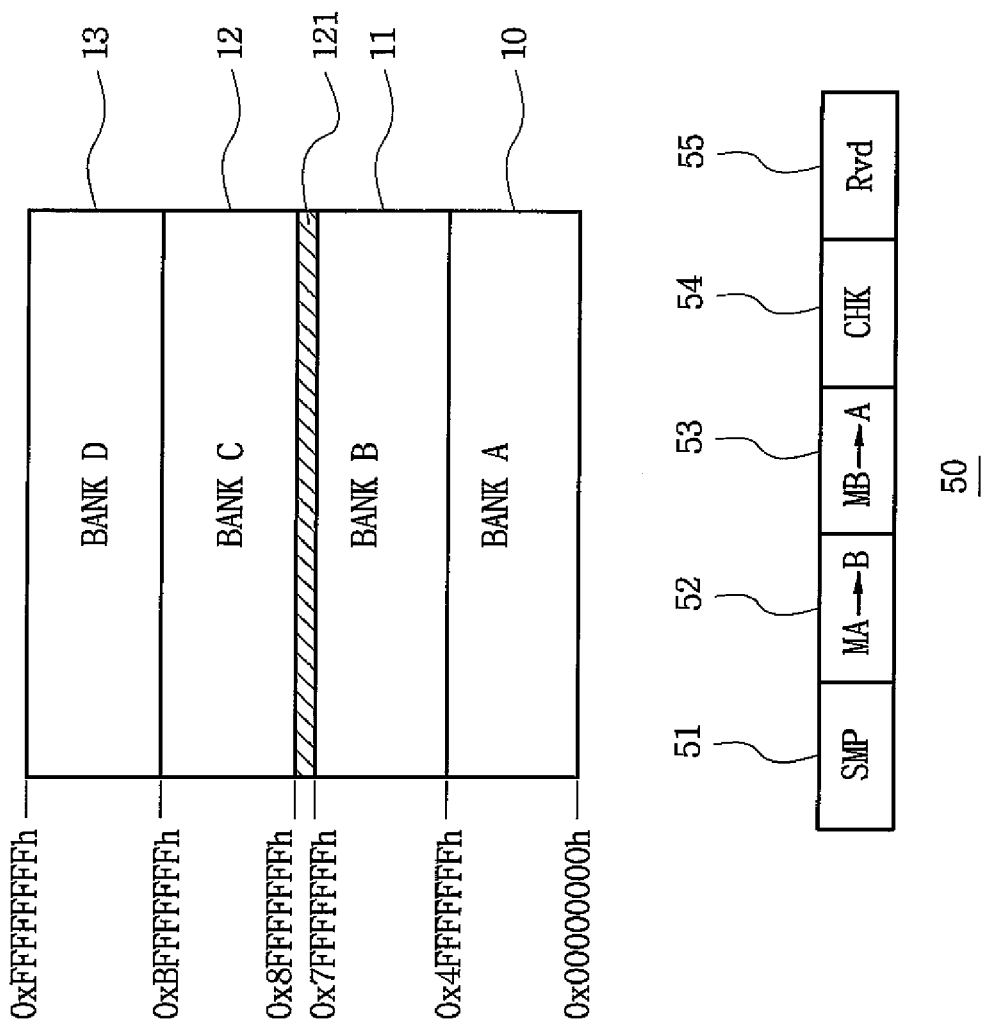

MULTIPROCESSOR SYSTEM HAVING MULTIPORT SEMICONDUCTOR MEMORY WITH PROCESSOR WAKE-UP FUNCTION RESPONSIVE TO STORED MESSAGES IN AN INTERNAL REGISTER

CROSS REFERENCE TO RELATED APPLICATIONS

This application claims priority under 35 U.S.C. §119 from Korean Patent Application 10-2007-0097643, filed on Sep. 28, 2007, the contents of which are hereby incorporated by reference in their entirety for all purposes as if fully set forth herein.

BACKGROUND OF THE INVENTION

1. Embodiments of the Invention

The invention relates to multiprocessor systems, and more particularly, but without limitation, to a multiport semiconductor memory device configured to generate an interrupt signal, and a multiprocessor system employing the same.

2. Description of the Related Art

In recent mobile communication systems, electronic instruments such as portable multimedia players (PMPs), handheld phones (HHPs), and personal digital assistants (PDAs) include multiple processors within one system to achieve high-speed operation. In such a system, a semiconductor memory device must be adapted for multiprocessor access. For example, the memory device may have multiple access ports, and it may be required to simultaneously input/output data through the multiple access ports.

One type of semiconductor memory device having two access ports is called a dual-port memory. A known dual-port memory used for image processing applications includes a random access memory (RAM) port accessible in a random sequence and a sequential access memory (SAM) port accessible only in a serial sequence. Dual-port memory has limited application, however.

A Dynamic Random Access Memory (DRAM) that does not employ an SAM port, and for which a shared memory area is accessible by processors through multiple access ports, is called herein a multiport semiconductor memory device or multipath-accessible semiconductor memory device to distinguish from the dual-port memory.

An example of a conventional art multiport semiconductor memory is disclosed in U.S. Publication No. 2003/0093628. As disclosed therein, a memory array is constructed of first, second and third portions. The first portion of the memory array is accessed only by a first processor, the second portion is accessed only by a second processor, and the third portion is a shared memory area accessed by the first and the second processors. The disclosure is lacking in many respects, however, for example with respect to processor-to-processor communications.

Semiconductor memory devices that more efficiently support a wide range of multiprocessor system architectures are needed.

BRIEF SUMMARY OF THE INVENTION

Accordingly, some embodiments of the invention provide a multiprocessor system capable of performing a processor wake-up function through a multiport DRAM interface.

An embodiment of the invention provides a multiprocessor system. The multiprocessor system includes: a first processor configured to perform a first predetermined task; a second processor configured to perform a second predetermined task; and a multiport semiconductor memory device coupled to the first processor and the second processor, the multiport semiconductor memory device including: a memory cell array having at least one shared memory area; a first port coupled to the at least one shared memory area; a second port coupled to the at least one shared memory area; and a wake-up signal generator, the first processor being coupled to the at least one shared memory area via the first port, the second processor being coupled to the at least one shared memory area via the second port, the wake-up signal generator being coupled to the first processor and the second processor.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 5 is a memory diagram of a multiport DRAM device, according to an embodiment of the invention;

DETAILED DESCRIPTION

Embodiments of the present invention now will be described more fully hereinafter with reference to the figures, in which embodiments of the invention are shown. This invention may, however, be embodied in many different forms and should not be construed as limited to the embodiments set forth herein. Rather these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
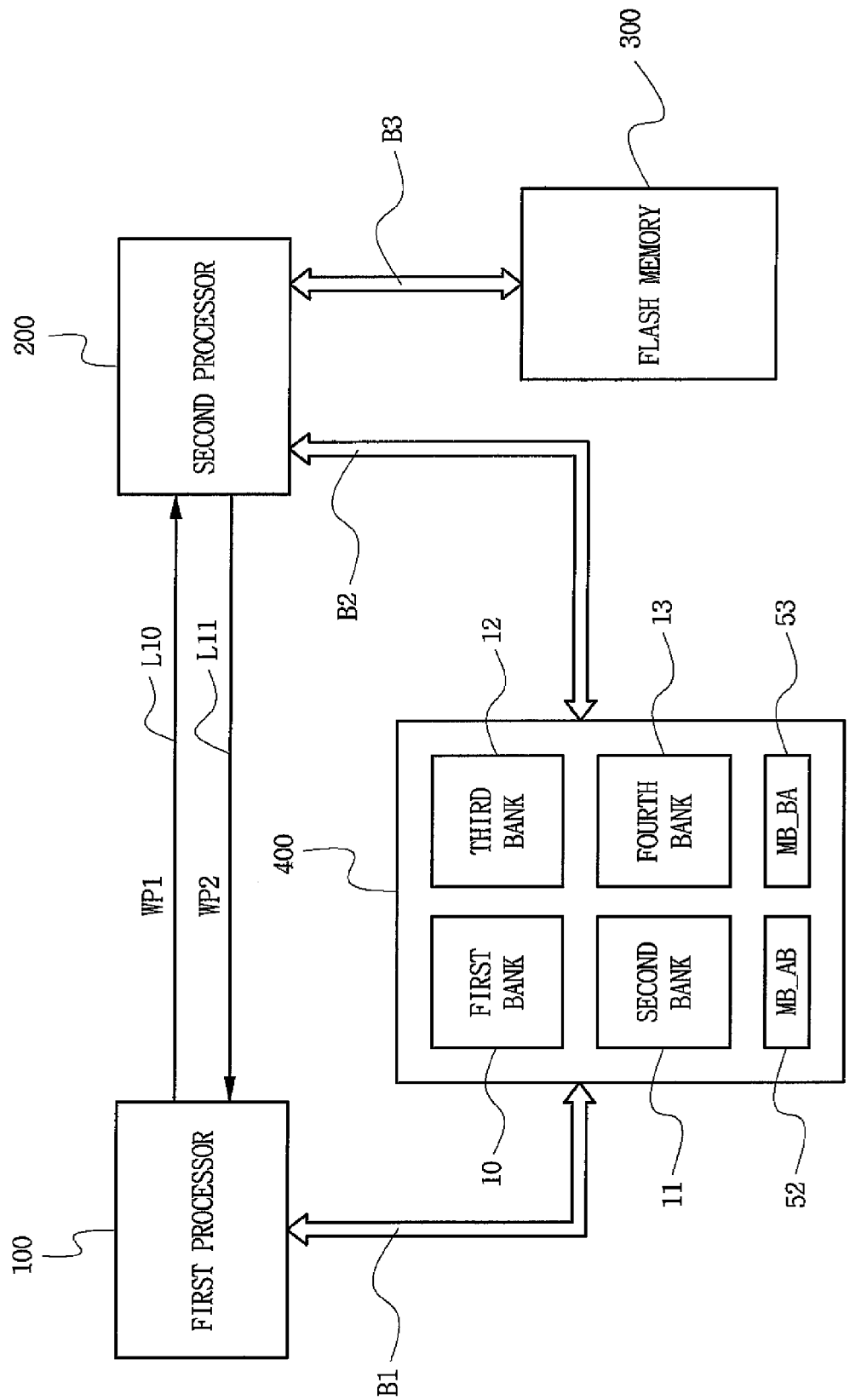
FIG. 1 is a block diagram of a multiprocessor system.

FIG. 1 is a block diagram of a multiprocessor system. The multiprocessor system illustrated therein and described below may be suitable, for example, in a mobile communication system.

As shown in FIG. 1, the multiprocessor system includes first and second processors 100 and 200, a multiport DRAM 400, and a flash memory 300. The multiport DRAM 400 is coupled to the first and second processors 100 and 200, and the flash memory 300 is coupled to the second processor 200. The first processor 100 may function, for example, as a communication signal Modulator/Demodulator (MODEM), and the second processor 200 may execute a game or other high-level application program.

The flash memory 300 may be an NOR flash memory or a NAND flash memory. NOR flash memory and NAND flash memory are nonvolatile memory devices constructed of MOS transistors with floating gates. Such nonvolatile memory devices are adapted to store instructions or data that must not be deleted even if power is turned off. Such instructions or data may be or include, for example, boot codes or other preservation data.

The multiport DRAM 400 functions as a main memory for data associated with processors 100 and 200. The multiport DRAM includes two ports (not shown). A first port (not shown) is coupled to system bus B1 and a second port (not shown) is coupled to system bus B2. The multiport DRAM 400 is coupled to the first processor 100 via the system bus B1, and is further coupled to the second processor 200 via the system bus B2. The flash memory 300 is coupled to the second processor 200 via the system bus B3.

In the multiport DRAM 400 of FIG. 1, a memory cell array 14 includes four memory areas 10, 11, 12 and 13. The first bank 10 may only be accessed by the first processor 100 via system bus B1, and the third and fourth banks 12 and 13 may only be accessed by the second processor 200 via the system bus B2. The second bank 11 may be accessed by the first processor 100 via the system bus B1 and also by the second processor 200 via the system bus B2. In other words, in the multiport DRAM 400, the second bank 11 may be a shared memory area, and the first, third and fourth banks 10, 12 and 13 may be dedicated memory areas. Each of the first, second, third, and fourth banks 10, 11, 12, and 13 may include, for instance, 64 Mb, 128 Mb, 256 Mb, 512 Mb or 1024 Mb of memory.

Mailboxes 52 and 53 are storage areas included in an internal register adapted separately from the memory cell array 14 within the multiport DRAM 400. The mailboxes 52 and 53 may be constructed, for example, of a latch type storage cell that does not require a refresh operation.

Mailboxes 52 and 53 may be used so that the first processor 100 can leave a message for the second processor 200, and vice-versa. Such a message may include commands and/or data. Accordingly, using the mailbox feature, the first processor 100 may be indirectly coupled to the flash memory 300 through the multiport DRAM 400.

As described above, the multiprocessor system of FIG. 1 includes a multiport DRAM 400 with a shared memory area (e.g., the second bank 11). In addition, both the first processor 100 and the second processor 200 may access the flash memory 300. Thus, the number of memory devices can be reduced relative to system designs that do not provide for memory sharing. This reduction in the number of memory devices can result in a corresponding reduction in device footprint and power consumption, and an increase in speed.

The multiprocessor system shown in FIG. 1 enables a wake-up function between the first processor 100 and the second processor 200. In particular, link L10 transmits a wake-up signal WP1 from the first processor 100 to the second processor 200, and link L11 transmits a wake-up signal WP2 from the second processor 200 to the first processor 100. At the physical layer, links L10 and L12 may include, for example, copper traces in a Printed Circuit Board (PCB) between a pin socket of the first processor 100 and a pin socket of the second processor 200.

Such a wake-up function between processors may be desirable. For example, while a passenger is aboard a commercial airplane, the use of external communication devices may be restricted. In this case, the passenger may select a flight mode. In response to the flight mode selection, a handheld device that includes the multiprocessor system of FIG. 1 may be configured to place the first processor 100 (a communication MODEM processor, for instance) in an idle or sleep state. Such action limits power consumption. While the first processor 100 is in the idle or sleep state, the second processor 200 can execute application programs that do not require external communications. Upon deactivation of the flight mode, the second processor 200 outputs the wake-up signal WP2 to the first processor 100 via the link L11 to reactivate the MODEM communication functions of the first processor 100.

Figure 2:
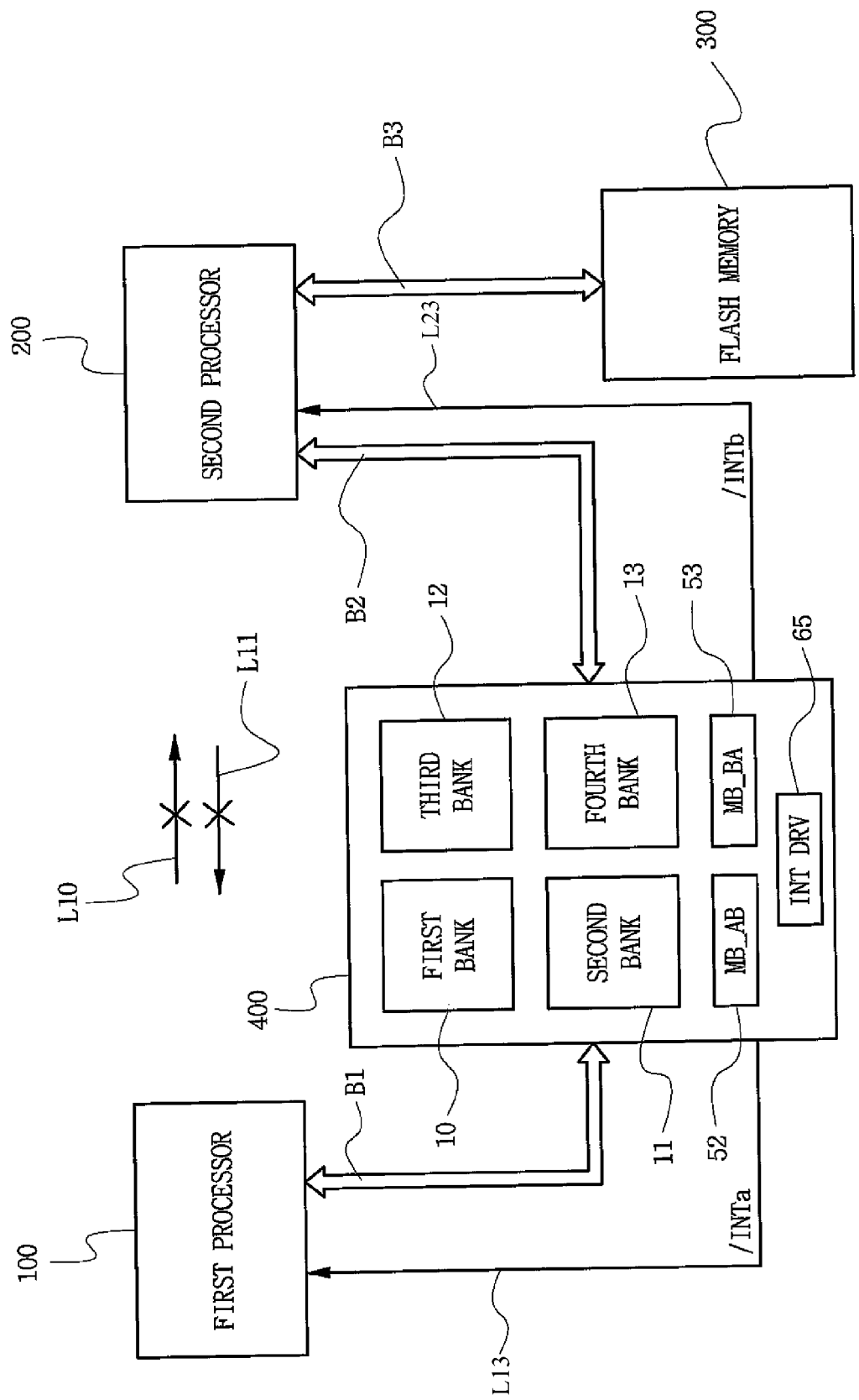
FIG. 2 is a block diagram of a multiprocessor system with an interrupt driver, according to an embodiment of the invention.

FIG. 2 is a block diagram of multiprocessor system with an interrupt driver, according to an embodiment of the invention. The multiprocessor system in FIG. 2 is substantially similar to the multiprocessor system described above with reference to FIG. 1, except as described below.

In the multiprocessor system in FIG. 2, the multiport DRAM 400 includes an interrupt driver 65. The interrupt driver 65 may be configured to generate an interrupt signal in response to the receipt of a message in one of the mailboxes 52 and 53. For example, when a message is received in the mailbox 53 from the second processor 200, the interrupt driver 65 may output an interrupt signal /INTa to the first processor 100 via link L13. In response to the interrupt signal /INTa, an interrupt controller (not shown) of the first processor 100 may cause the first processor 100 to read the message stored in the second mailbox 53. The first processor 100 may also execute code associated with the message.

The interrupt signals /INTa and /INTb may be used to implement the processor wake-up function. That is, the first processor 100 and second processor 200 are responsive to the corresponding interrupt signals /INTa and /INTb without regard to a state of the processor. For instance, the first processor 100 is responsive to the interrupt signal /INTa whether the first processor 100 is in an active state or a sleep state.

The multiprocessor system shown in FIG. 2 does not include links L10 and L11 between the first processor 100 and the second processor 200. Instead, in FIG. 2, link L13 carries interrupt signal /INTa from the multiport DRAM 400 to the first processor 100, and link L23 carries the interrupt signal /INTb from the multiport DRAM 400 to the second processor 200. The elimination of copper traces associated with links L10 and L11 may simplify circuit routing in the multiprocessor system illustrated in FIG. 2 as compared to routing in the multiprocessor system of FIG. 1.

In FIG. 2, the connections between the multiport DRAM 400, the second processor 200, and the flash memory 300 can be referred to as a Memory Link Architecture (MLA).

Figure 3:
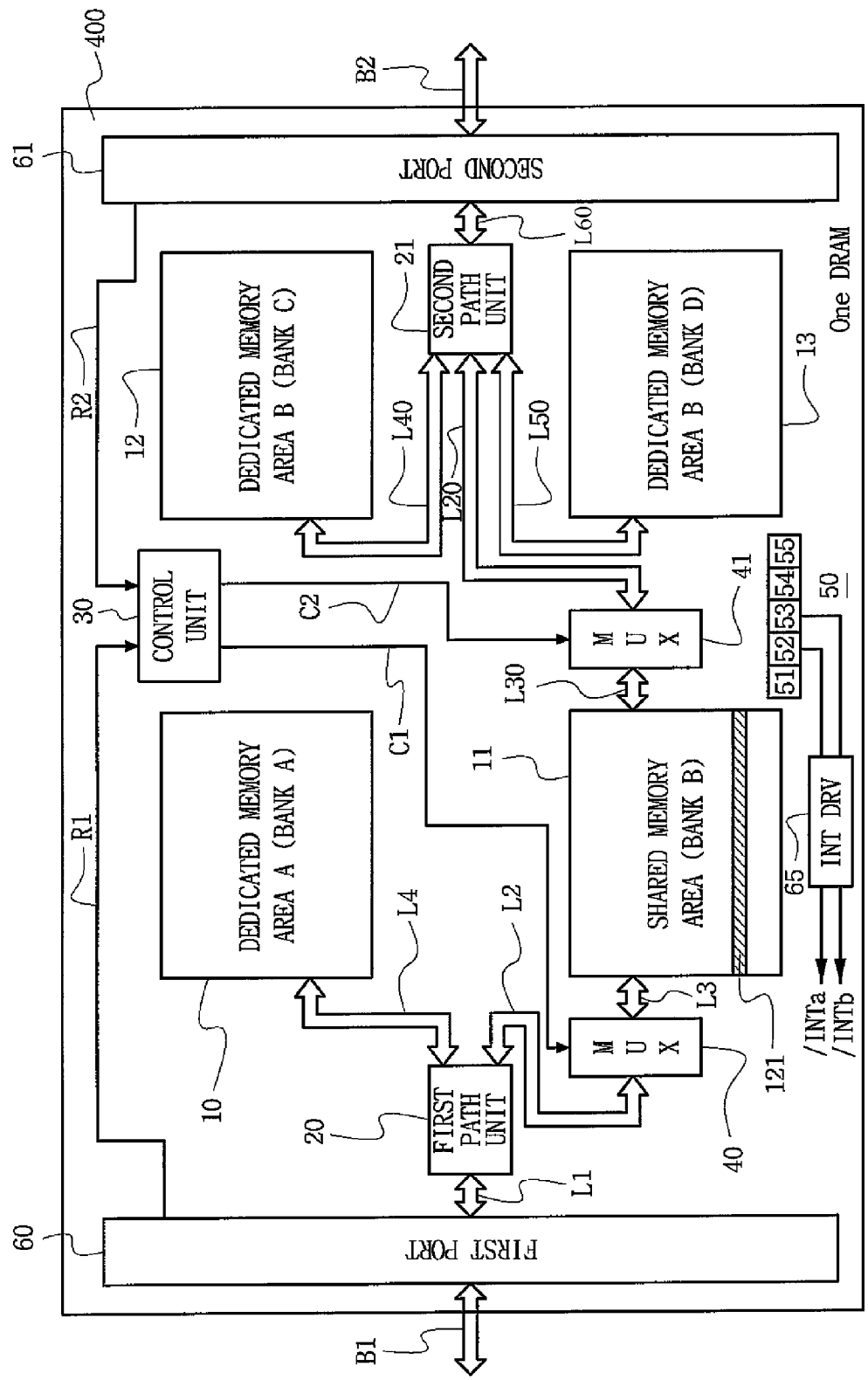
FIG. 3 is a more detailed block diagram of the multiport DRAM device shown in FIG. 2, according to an embodiment of the invention.

FIG. 3 is a more detailed block diagram of the multiport DRAM device 400 shown in FIG. 2, according to an embodiment of the invention.

As shown in FIG. 3, the multiport semiconductor memory device 400 includes an interrupt driver 65 that functions as a wake-up signal generator. The interrupt driver 65 is configured to generate an interrupt signal /INTa to wake up the first processor 100, and is further configured to generate interrupt signal /INTb to wake up the second processor 200.

The multiport semiconductor memory device 400 includes at least one shared memory area 11. The first processor 100 can access the shared memory area 11 through a first port 60, and the second processor 200 can access the shared memory area 11 through a second port 61.

A dedicated memory area A, 10 is accessed by first processor 100 through the first port 60. Dedicated memory areas B, 12 and 13 are accessed by second processor 200 through the second port 61.

In FIG. 3, internal register 50 provides an interface to the first and second processors 100 and 200, and may be or include, for instance, a flip-flop, data latch or SRAM cell. The internal register 50 includes a semaphore (SMP) area 51, first mailbox area (MA→B) 52, second mailbox area (MB→A) 53, check bit (CHK) area 54, and reserve (Rvd) area 55.

The SMP 51 controls access to the shared memory area 11. The first and second mailboxes 52 and 53 store, for example, a shared memory address, data, or commands being transmitted between processors. For example, the first mailbox area 52 may store data and commands being sent from the first processor 100 to the second processor 200, and the second mailbox area 53 may store data and commands being sent from the second processor 200 to the first processor 100.

A control unit 30 couples the shared memory area 11 to one of the first and second processors 100 and 200. A signal line R1 connected between the first port 60 and the control unit 30 transfers a first external signal applied through bus B1 from the first processor 100. A signal line R2 connected between the second port 61 and the control unit 30 transfers a second external signal applied through bus B2 from the second processor 200. The first and second external signals may include a row address strobe signal RASB, write enable signal WEB and bank selection address BA individually applied through the first and second ports 60 and 61.

Signal line C1 transfers a path decision signal MA from the control unit 30 to the multiplexer (MUX) 40 to couple the shared memory area 11 to the first port 60 via MUX 40, first path unit 20 and buses L1, L2 and L3. Signal line C2 transfers a path decision signal MB from the control unit 30 to the MUX 41 to couple the shared memory area 11 to the second port 61 via MUX 41, second path unit 21, and buses L60, L20 and L30. The first path unit 20 couples the dedicated memory area 10 to the first port 60 via the buses L1 and L4. The second path unit 21 couples the dedicated memory areas 12 and 13 to the second port 61 respectively via L60 and L40, and buses L60 and L50.

Figure 4A:
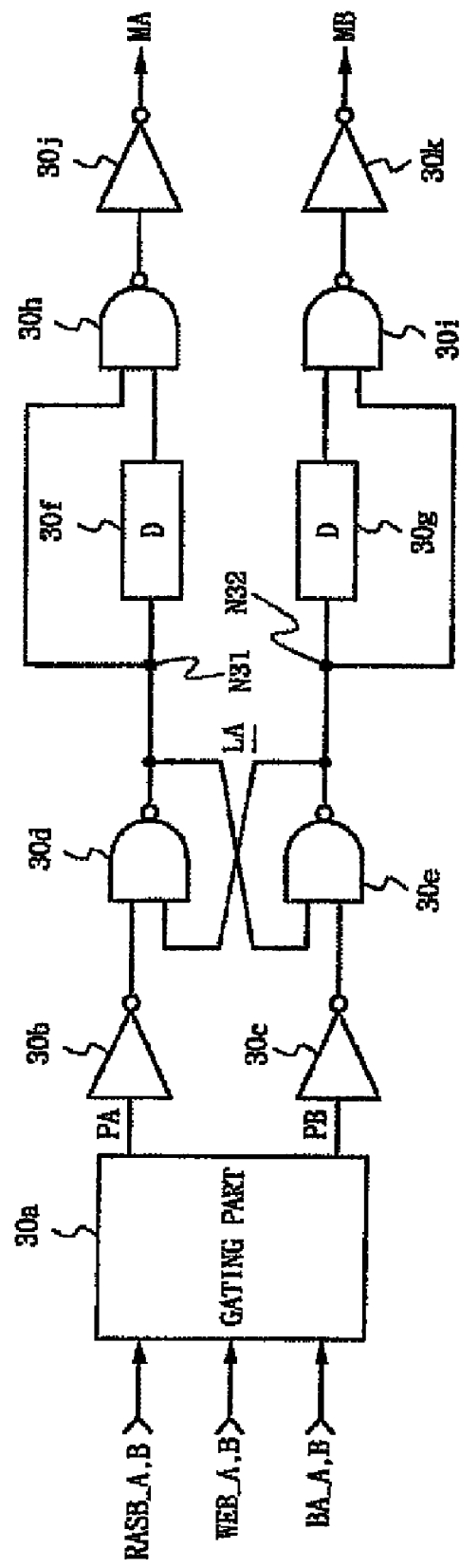
FIGS. 4A and 4B are schematic diagrams of the control unit shown in FIG. 3, and timings for operation thereof, according to an embodiment of the invention.
Figure 4B:
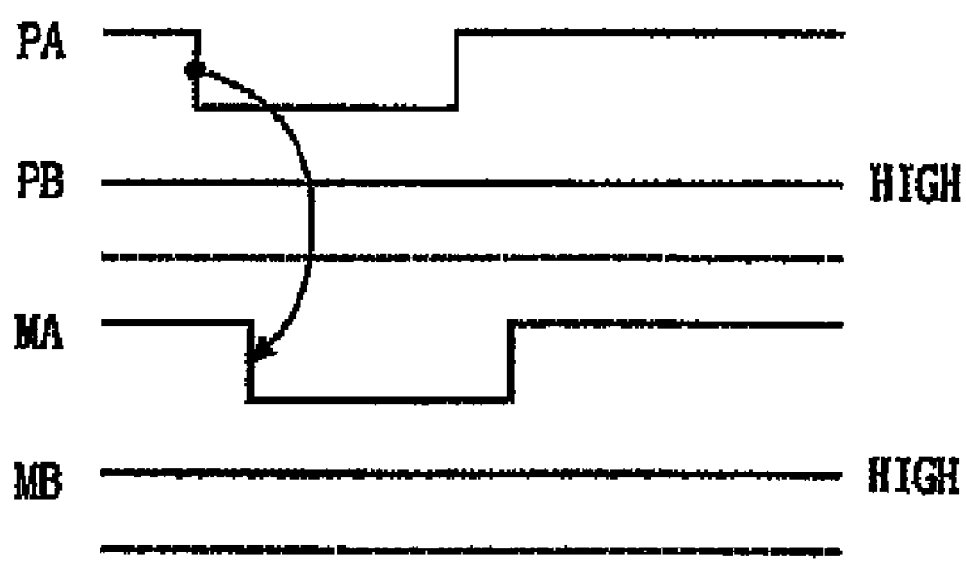

FIGS. 4A and 4B are schematic diagrams of the control unit 30 shown in FIG. 3, and timings for operation thereof, according to an embodiment of the invention. A gating part 30a receives a bank selection address BA_A, BA_B, a write enable signal WEB_A, WEB_B and a row address strobe signal RASB_A, RASB_B from the corresponding first and second ports 60 and 61. The gating part 30a outputs gating signals PA and PB.

When a row address strobe signal RASB is received from one of the ports, the gating part 30a assigns the shared memory area 11 to the corresponding port. When the row address strobe signals RASB_A and RASB_B are applied simultaneously, the gating part 30a provides access to the shared memory area 11 based on a predetermined priority specification.

The control unit 30 also includes inverters 30b, 30c, 30j and 30k, a latch LA constructed of NAND gates 30d and 30e, delay devices 30f and 30g, and NAND gates 30h and 30i, coupled as illustrated in FIG. 4A. Node N31 is disposed between NAND gate 30d and delay device 30f, and node N32 is disposed between NAND gate 30e and delay device 30q. The path decision signal MA is a delayed and latched variant of the gating signal PA. The path decision signal MB is a delayed and latched variant of the gating signal PB. An example of such relationship is illustrated in the timing diagram of FIG. 4B.

FIG. 5 is a memory diagram of a multiport DRAM device, according to an embodiment of the invention. The areas 51-55 of the internal register 50 may be enabled in common by a specific row address, and may be individually accessed by an applied column address. For example, when a row address 0x7FFFFFFFh~0x8FFFFFFFh associated with area 121 of the shared memory area 11 is received in the multiport DRAM 400, area 121 of the shared memory area 11 is disabled, and the internal register 50 is enabled. As a result, the semaphore area 51 and mailbox areas 52 and 53 are accessed by using a direct address mapping method. A command associated with a disabled address is decoded and mapped to a DRAM internal register. The semaphore area 51, the first mailbox area 52 and the second mailbox area 53 may be each assigned 16 bits, and the check bit area 54 may be assigned 4 bits. Other register sizes could also be used, according to design choice.

Figure 6:
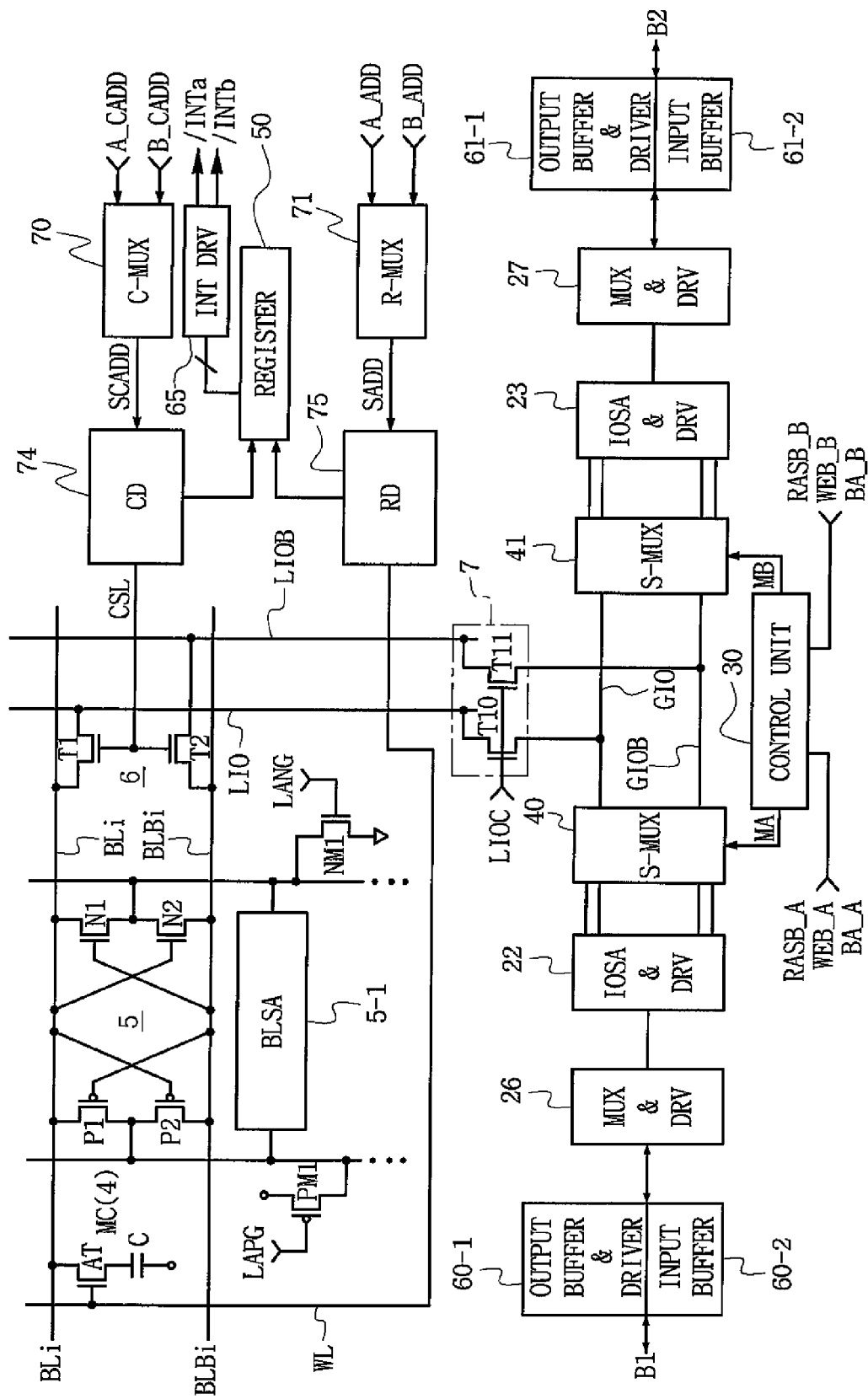
FIG. 6 is a schematic diagram of a portion of the multiport DRAM device that is associated with access to the shared memory area, according to an embodiment of the invention.
Figure 7:
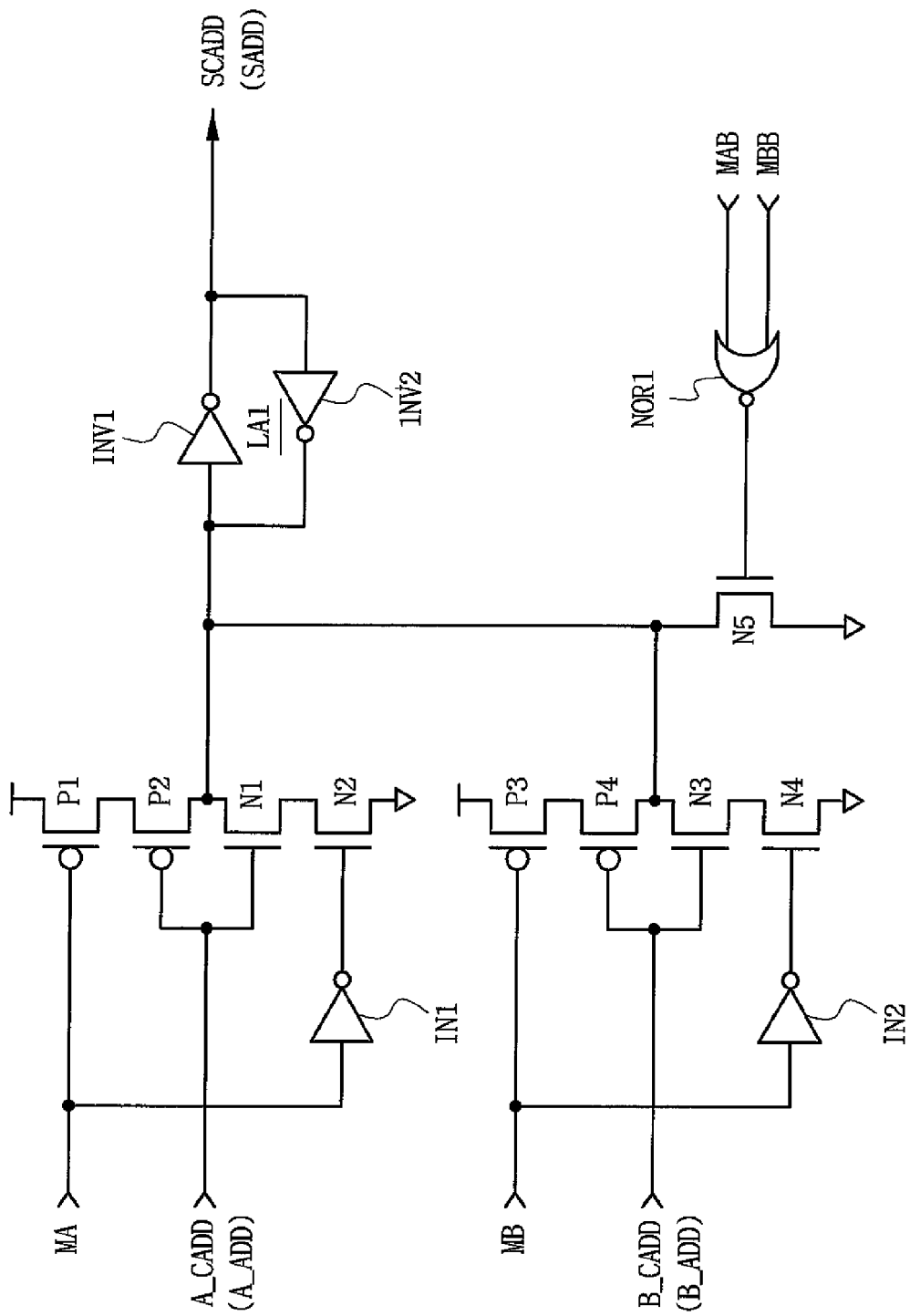
FIG. 7 is a circuit diagram of the address multiplexer shown in FIG. 6, according to an embodiment of the invention.

FIG. 6 is a schematic diagram of a portion of the multiport DRAM device that is associated with access to the shared memory area, according to an embodiment of the invention. FIG. 7 is a circuit diagram of the address multiplexer shown in FIG. 6, according to an embodiment of the invention. FIG. 7 is described first.

FIG. 7 illustrates an example of the row address multiplexer 71 and column address multiplexer 70 shown in FIG. 6. The same circuit can function as either a row address multiplexer or a column address multiplexer, according to the input signal. The address multiplexer includes two clocked-CMOS inverters constructed of PMOS transistors P1-P4 and NMOS transistors N1-N4, and an inverter latch LA1 constructed of inverters INV1 and INV2. The clocked CMOS inverters each receive an address (for example A_CADD and B_CADD, in the case of a column address multiplexer) at an input port, and select one of two inputs according to a logic state of the path decision signals MA and MB. The address multiplexer outputs the selected address (for example, a selected column address SCADD). An NMOS transistor N5 and a NOR gate NOR1 are adapted to provide a discharge path between an input terminal of the inverter latch LA1 and ground. Inverters IN1 and IN2 are adapted to invert a logic state of the path decision signals MA and MB.

As an example of operation, when the path decision signal MA is applied with a logic low level, column address A_CADD received through the first port 60 is inverted through an inverter constructed of PMOS transistor P2 and NMOS transistor N1, is again inverted through the inverter INV1, and then is output as the selected column address SCADD. In this case, the path decision signal MB is applied with a logic high level. Thus column address B_CADD received through the second port 61 is not provided to an input terminal of the latch LA1 since the inverter constructed of PMOS transistor P4 and NMOS transistor N3 has an inactive state. As a result, column address B_CADD, is not output as the selected column address SCADD. When an output of the NOR gate NOR1 becomes a high level, the NMOS transistor N5 is turned on and a logic level latched to the latch LA1 is set to a low level.

Turning now to the portion of the multiport DRAM device 400 illustrated in FIG. 6, a memory cell MC(4) is a memory cell belonging to the shared memory area 11 in FIGS. 2, 3, and 5. The S-MUX 40 and S-MUX 41 are disposed symmetrically on the shared memory area 11. Likewise, an input/output sense amplifier (IOSA) and driver (DRV) 22 is disposed near the S-MUX 40, and an IOSA and DRV 23 is disposed near the S-MUX 41.

Within the shared memory area 11, the memory cell MC(4) includes an access transistor AT and a storage capacitor C.

The memory cell MC(4) is connected to a word line WL and bit line BLi. In particular, the word line WL is disposed between a gate of access transistor AT of the memory cell MC(4) and a row decoder 75. The row decoder (RD) 75 applies a decoded row signal to the word line WL or the internal register 50 in response to a selection row address SADD of the row address multiplexer 71. A bit line BLi constituting a bit line pair is coupled to a drain of the access transistor AT and a column selection transistor T1. A complementary bit line BLBi is coupled to a column selection transistor T2. PMOS transistors P1 and P2 and NMOS transistors N1 and N2 coupled to the bit line pair BLi, BLBi constitute a bit line sense amplifier 5. Sense amplifier driving transistors PM1 and NM1 each receive a corresponding drive signal LAPG, LANG, and drive the bit line sense amplifiers 5 and 5-1. A column selection gate 6 constructed of the column selection transistors T1 and T2 is coupled to a column selection line CSL transferring a decoded column signal of the column decoder 74. The column decoder 74 outputs a decoded column signal to the column selection line CSL and the internal register 50 in response to a selected column address SCADD of the column address multiplexer 70.

With further reference to FIG. 6, a local input/output line pair LIO, LIOB is coupled to a first multiplexer 7. When transistors T10 and T11 included in the first multiplexer 7 are turned on in response to a local input/output line control signal LIOC, the local input/output line pair LIO, LIOB is coupled to a global input/output line pair GIO, GIOB. Then, data of the local input/output line pair LIO, LIOB is transferred to the global input/output line pair GIO, GIOB in a data read operating mode. On the other hand, write data applied to the global input/output line pair GIO, GIOB is transferred to the local input/output line pair LIO, LIOB in a data write operating mode. The local input/output line control signal LIOC may be a signal generated in response to a decoded signal output from the row decoder (RD) 75.

When the path decision signal MA output from control unit 30 has an active state, read data transferred to the global input/output line pair GIO, GIOB is transferred to the input/output sense amplifier (IOSA) and driver 22 through the S-MUX 40. The IOSA 22 amplifies data whose level has weakened according to the transfer procedure through several data paths. Read data output from the IOSA 22 is transferred to the first port 60 through MUX and driver 26. At this same time, the path decision signal MB is in an inactive state. Thus the S-MUX 41 is disabled and the second processor 200 cannot access the shared memory area 11. However, in this case, the second processor 200 can still access the dedicated memory areas 12 and 13 through the second port 61.

When path decision signal MA output from the control unit 30 has an active state, write data received through the first port 60 is transferred to the global input/output line pair GIO, GIOB, sequentially passing through the MUX and driver 26, IOSA and driver 22, and the S-MUX 40. When the multiplexer 7 is activated, the write data is transferred to local input/output line pair LIO, LIOB and then is stored in a selected memory cell, for example MC(4).

An output buffer and driver 60-1 and input buffer 60-2 shown in FIG. 6 may correspond to or be included in the first port 60. Incidentally, S-MUX 41, IOSA and driver 23, MUX and driver 27, output buffer and driver 61-1 and input buffer 61-2 operate in a similar manner as described above when the path decision signal MB from control unit 30 has an active state.

The first and second processors 100 and 200 commonly use circuit devices and lines that are adapted between global input/output line pair GIO, GIOB and memory cell MC(4) in an access operation, and independently use input/output related circuit devices and lines adapted between the corresponding port and S-MUX devices 40 and 41.

As described above, the processors 100 and 200 can communicate with each other through the shared memory area 11 by using the internal register 50 as an interface unit. Moreover, the wake-up function can be realized by writing a message from the first and second processors 100 and 200 into a corresponding mailbox 52 and 53.

Returning to the example where the multiprocessor system includes a wireless phone, the processor 100 enables MODEM communications, the processor 200 enables other applications, and a user has placed the first processor in a sleep mode during a commercial airline flight, the user may seek to re-establish MODEM communications at the conclusion of the flight. Accordingly, a user may terminate a flight mode of the phone. In response, the second processor 200 may write a predetermined wake-up message to second mailbox 53 through the bus B2. The bus B2 may be, for example, a general-purpose input/output (GIPO) line. The interrupt driver 65 then outputs the interrupt signal /INTa to the first processor 100. The interrupt signal /INTa is used as a wake-up signal, and thus may be applied to a wake-up terminal of the first processor 100 via link L13. The first processor 100 wakes-up in response to the wake-up signal, restoring the MODEM communication functions of the first processor 100.

In embodiments of the invention, the wake-up terminal of the first processor 100 is an interrupt terminal. The interrupt signal /INTa is processed as a wake-up signal (as described above), and not an interrupt signal, because an interrupt signal is not valid during a sleep state of the first processor 100.

On the other hand, an idle state of the second processor 200 may correspond to a time that a user does not use display functions associated with the wireless phone. That is, the first processor 100 may be in an activated state and the second processor 200 may be in a sleep state. When the first processor 100 receives an incoming call, the first processor 100 may write a predetermined wake-up message to the mailbox 52 via bus B1. Then, the interrupt driver 65 may output an interrupt signal /INTb to the second processor 200. The interrupt signal /INTb is used as a wake-up signal that is applied to a wake-up terminal of the second processor 200 via link L23. The second processor 200 wakes-up in response to the wake-up signal and is able to perform display functions associated with the incoming call.

In embodiments of the invention, the wake-up terminal of the second processor 200 is an interrupt terminal. The interrupt signal /INTb is processed as a wake-up signal (rather than an interrupt signal) because an interrupt signal would not be valid during a sleep state of the second processor 200.

One benefit of the embodiment described above with reference to FIGS. 2-7 is that copper traces associated with links L10 and L11 may be omitted, simplifying a printed circuit board (PCB) associated with the multiprocessor system. Another benefit is that wake-up signals /INTa and /INTb can be output from the multiport DRAM 400 to interrupt pins of the first and second processors 100 and 200, respectively, which may simplify implementation of the wake-up algorithm in the first and second processors 100 and 200.

It will be apparent to those skilled in the art that modifications and variations can be made in the present invention without deviating from the spirit or scope of the invention. For example, the configuration for a shared memory bank of multiport semiconductor memory device or the configuration and access method of an internal register circuit may be varied, according to design choice. In addition, the multiprocessor system architectures described herein are applicable to multiprocessor systems having three or more processors. Moreover, in the multiprocessor system, one or more processors may be a microprocessor, a Central Processing Unit (CPU), a Digital Signal Processor (DSP), a micro-controller, a reduced-command set computer, a complex command set computer, or the like. Furthermore, the scope of the invention is not limited to any special combination of processors or applications used in the above-described embodiments. And although embodiments of the invention illustrated nonvolatile memory with reference to flash memory devices and volatile memory with reference to DRAM devices, the invention could be adapted to other memory device types. Thus, it is intended that the present invention cover any such modifications and variations of this invention provided they come within the scope of the appended claims and their equivalents.

What is claimed is:

1. A multiprocessor system comprising:
   a first processor configured to perform a first predetermined task;
   a second processor configured to perform a second predetermined task; and
   a multiport semiconductor memory device coupled to the first processor and the second processor, the multiport semiconductor memory device including
     a memory cell array having at least one shared memory area,
     a first port coupled to the at least one shared memory area,
     a second port coupled to the at least one shared memory area,
     a wake-up signal generator,
   the first processor being coupled to the at least one shared memory area via the first port, the second processor being coupled to the at least one shared memory area via the second port, and the wake-up signal generator being coupled to the first processor and the second processor, and
   an internal register coupled to the wake-up signal generator, the internal register being disposed outside the memory cell array, the internal register being accessed responsive to predetermined addresses of the at least one shared memory area to provide a data interface function and to store messages provided by the first processor and the second processor,
   the wake-up signal generator configured to generate and send wake-up signals to the first and second processors responsive to the stored messages in the internal register.

2. The system of claim 1, further comprising a NAND type flash memory device coupled to the second processor.

3. The system of claim 1, wherein the first predetermined task includes at least one of a modulation function and a demodulation function.

4. The system of claim 1, wherein the second predetermined task includes processing media information.

5. The system of claim 1, wherein the internal register includes a first mailbox area configured to store a message from the second processor to the first processor.

6. The system of claim 5, wherein the wake-up signal generator is configured to output a first wake-up signal to a first wake-up terminal of the first processor in response to the message stored in the first mailbox area.

7. The system of claim 6, wherein the internal register further includes a second mailbox area configured to store a message from the first processor to the second processor.

8. The system of claim 7, wherein the wake-up signal generator is further configured to output a second wake-up signal to a second wake-up terminal of the second processor in response to the message stored in the second mailbox area.

9. The system of claim 8, wherein the first wake-up signal and the second wake-up signal are interrupt signals.

10. The system of claim 8, wherein the first wake-up terminal and the second wake-up terminal are interrupt terminals.

11. The system of claim 7, wherein the internal register further includes a semaphore area.

12. The system of claim 7, wherein the internal register further includes a check bit area.

13. The system of claim 1, wherein the memory cell array further has:
    a first dedicated memory area configured to be accessed by the first processor and not the second processor; and
    a second dedicated memory area configured to be accessed by the second processor and not the first processor.

14. The system of claim 13, wherein the multiport semiconductor device further includes:
    a first path unit coupled to the first port and the first dedicated memory area, the first path unit being part of a first data channel associated with the first processor; and
    a second path unit coupled to the second port and the second dedicated memory area, the second path unit being part of a second data channel associated with the second processor.

15. The system of claim 14 wherein the multiport semiconductor device further includes a control unit, the control unit coupled to the first port via a first signal line, the control unit being coupled to the second port via a second signal line, the control unit configured to control access to the at least one shared memory area.

16. The system of claim 15 wherein the control unit is configured to perform a latching function and a delay function.

17. The system of claim 15 wherein the multiport semiconductor device further includes:
    a first multiplexer coupled to the control unit, the at least one shared memory area, and the first path unit; and
    a second multiplexer coupled to the control unit, the at least one shared memory area, and the second path unit.

18. The system of claim 17 wherein the multiport semiconductor device further includes a third dedicated memory area configured to be accessed by the second processor and not the first processor, the third dedicated memory area being coupled to the second path unit.

19. The system of claim 13 wherein the multiport semiconductor device further includes a third dedicated memory area configured to be accessed by the second processor and not the first processor.

* * * * *